United States Patent Office 2,838,516
Patented June 10, 1958

2,838,516
2-(THIENYL METHYL) PIPERIDINES

Karl Hoffmann and Jules Herr, Binningen, Switzerland, assignors to Ciba Pharmaceutical Products, Inc., Summit, N. J.

No Drawing. Application January 31, 1955
Serial No. 485,322

Claims priority, application Switzerland February 5, 1954

7 Claims. (Cl. 260—293.4)

This invention relates to piperidine compounds of the formula

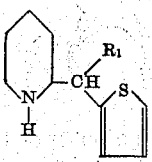

in which $R_1$ represents a phenyl or thienyl-(2) radical and salts thereof.

The new piperidine compounds exhibit a stimulating effect on the central nervous system which is exhibited by an increase of spontaneous motor activity.

The new piperidines can be prepared by hydrogenating a pyridine of the formula

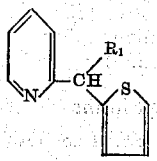

wherein $R_1$ has the meaning defined above.

The hydrogenation is advantageously carried out with nascent hydrogen, for example, by treatment with an alkaline metal, such as sodium, in an alcohol, such as butanol.

Depending on the procedure used the new compounds are obtained in the form of their bases or their salts. The free piperidines can be obtained from the salts by, for example, treatment with an alkali. From the free piperidines salts can be obtained by action with acids which are suitable for the formation of therapeutically useful salts, such, for example, as hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, oxy ethane sulfonic acid, benzene or toluene sulfonic acid or a therapeutically active acid.

The following examples illustrate the invention, the parts being by weight unless otherwise stated and relationship of parts by weight to parts by volume being the same as that of the gram to the cubic centimeter:

EXAMPLE 1

A solution of 13 parts of 2-(phenyl-thienyl-(2')-hydroxy-methyl)-pyridine in 500 parts by volume of n-butanol is treated at 105–110° C. in portions with 30 parts of sodium. When the reaction is finished the alkaline butanol solution is poured into 2000 parts by volume of water and extracted by agitation with ether. After washing and drying the ethereal solution, it is evaporated, the butanol is removed in vacuo, and the only residue is taken up in 600 parts by volume of acetic acid of 5% strength. Undissolved oily precipitated starting material is removed by extraction with ether, and then the clear aqueous solution is rendered alkaline. Finally the piperidine compound precipitated in an oily form is again taken up in ether, the ethereal solution is washed with water and dried over sodium sulfate. After distilling off the ether there remain behind 10 parts of 2-(phenyl-thienyl-(2')-methyl)-piperidine in the form of a pale colored resin. Its hydrochloride prepared by treatment with hydrochloric acid crystallizes from a mixture of methanol and ethyl acetate in small needles melting at 238–244° C. Other hydrohalide salts, e. g., the hydrobromide, can be prepared in a similar manner.

The starting material is prepared as follows: A solution of 36.6 parts of phenyl pyridyl ketone is added to a Grignard solution prepared from 11 parts of magnesium and 80 parts of 2-bromo-thiophene in 500 parts by volume of ether, the temperature of the reaction being maintained at −3° C. After the addition of the ketone the mixture is stirred at room temperature for a further hour, and is then poured onto ice and water. The ethereal layer is washed, dried over sodium sulfate, filtered and evaporated to dryness. There are obtained 45 parts of 2-(phenyl-thienyl-(2')-hydroxy-methyl)-pyridine melting at 82–84° C.

EXAMPLE 2

10 parts of 2-(phenyl-thienyl-(2')-methyl)-pyridine in 400 parts by volume of butanol are treated as described in Example 1 with 20 parts of sodium. The mixture is worked up as described in Example 1 and there are obtained in good yield 2-(phenyl-thienyl-(2')-methyl-piperidine and its hydrochloride.

The starting material can be prepared by boiling 10 parts of 2-(phenyl-thienyl-(2')-hydroxy-methyl)-pyridine in 200 parts by volume of glacial acetic acid and 200 parts by volume of water in the presence of 10 parts of iodine and 10 parts of red phosphorus for 1 hour under reflux. The reaction solution is then filtered to remove the phosphorus, the filtrate is concentrated in vacuo, and the brown concentrate containing iodine is poured into a solution of 20 parts of sodium bisulfite in 500 parts by volume of water in order to remove the iodine. Finally the aqueous solution is rendered alkaline with ammonia, and the precipitated oil is taken up in ether. After evaporating the ether, there is obtained 2-(phenyl-thienyl-(2')-methyl)-pyridine in the form of a resin. The hydrochloride prepared by treating the free base with hydrochloric acid crystallizes from a mixture of ethyl acetate and methanol.

EXAMPLE 3

A solution of 10 parts of 2-(phenyl-thienyl-(2')-hydroxy-methyl)-piperidine in 400 parts by volume of ethyl alcohol is treated in portions with 30 parts of sodium, and then worked up as described in Example 1. There are obtained 8 parts of 2-(phenyl-thienyl-(2')-methyl)-piperidine.

In order to prepare the starting material 18.2 parts of benzoyl-2-piperidine in 90 parts by volume of a mixture of benzene and ether are added to a Grignard solution prepared from 5 parts of magnesium and 35 parts of 2-bromo-thiophene in 250 parts by volume of ether. The reaction temperature is maintained at +1° C. for half an hour. After being heated to 24° C. the reaction solution is allowed to stand for 2 hours, and is then poured on to ice and worked up in the usual manner.

There are obtained 17 parts of 2-(phenyl-thienyl-(2')-hydroxy-methyl)-piperidine, which crystallizes from isopropyl ether in the form of lamellae melting at 129–130° C.

EXAMPLE 4

A solution of 15 parts of 2-(dithienyl-(2')-hydroxy-methyl)-piperidine in 500 parts by volume of n-butanol is treated at 115° C. with 30 parts of sodium. The reaction solution is then worked up as described in Example 1, and the crude product is purified by distillation in a high vacuum. The 2-(dithienyl-(2')-methyl)-piperidine boils between 180 and 190° C. at 0.5 mm. pressure, and yields on treatment with alcoholic hydrochloric acid a crystalline hydrochloride melting at 245–248° C. Other hydrohalide salts, for example, can be prepared in a similar manner.

The starting material is prepared by adding a solution of 23 parts of hexahydro-picolinic acid ethyl ester in 50 parts by volume of ether dropwise to a Grignard solution prepared from 12 parts of magnesium and 75 parts of 2-bromo-thiophene in 300 parts by volume of ether at 1–4° C. After the reaction has ceased, the reaction mixture is heated at 24° C. for 1 hour. Then it is poured into ice and water. The ethereal layer is washed and dried. After distilling off the ether there remain 22.3 parts of 2-(dithienyl-(2')-hydroxy-methyl)-piperidine, which crystallizes from methanol in the form of lustrous lamellae melting at 121–123° C.

The new compounds can be used as medicaments, for example, in the form of pharmaceutical preparations which contain them in admixture with a pharmaceutical organic or inorganic carrier material suitable for enteral or parenteral application. For the production of these preparations such carriers or adjuvants are employed to facilitate the administration, as do not react with the new compounds, for example water, gelatine, lactose, starch, magnesium stearate, talc, vegetable oils, benzyl alcohols, gums, polyalkylene glycols, petroleum jelly, cholesterol, or other known medicament carriers. The pharmaceutical preparations can take the form of, for example, tablets, dragees, or liquids, such as solutions, suspensions or emulsions. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are obtained by the usual methods employed in pharmaceutical formulation. For example the following preparations can be made:

| Tablets | 1.0 mg. | 5.0 mg. |
|---|---|---|
| | Mg. | Mg. |
| 1. 2-(phenyl-thienyl-(2')-methyl)-piperidine hydrochloride | 1.0 | 5.0 |
| 2. Talcum | 5.7 | 3.7 |
| 3. Lactose | 52.0 | 50.0 |
| 4. Gelatine | 1.0 | 1.0 |
| 5. Wheat Starch | 30.0 | 30.0 |
| 6. Arrowroot | 10.0 | 10.0 |
| 7. Magnesium Stearate | 0.3 | 0.3 |
| | 100.0 | 100.0 |

1 and 3 are mixed to a homogeneous powder, 4 and a part of 5 are added to make a paste. The remainder of 5 is added and the mass is granulated and dried. After this, 2, 6 and 7 are added and the product is tabletted.

Ampules

| | Mg. |
|---|---|
| 1. 2-(dithienyl-(2')-methyl)-piperidine hydrochloride | 2.0 |
| 2. Sodium chloride | 15.0 |
| 3. Secondary sodium phosphate | 2.0 |
| 4. Primary sodium phosphate | 4.0 |
| 5. Distilled water to make up 2.0 cc. | |

1 is dissolved in a buffer mixture composed of 3 and 4, 2 is added and the whole is filled up to 2 cc.

What is claimed is:

1. A member of the group consisting of piperidines of the formula

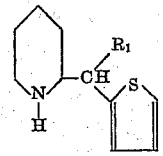

wherein $R_1$ stands for a member of the group consisting of phenyl and thienyl-(2) radicals, and non-toxic salts thereof.

2. 2-(phenyl-thienyl-(2')-methyl)-piperidine.

3. 2-(phenyl-thienyl-(2')-methyl)-piperidine hydrohalide the halogen having an atomic number greater than 10.

4. 2-(phenyl-thienyl-(2')-methyl)-piperidine hydrochloride.

5. 2-(dithienyl-(2')-methyl)-piperidine.

6. 2-(dithienyl-(2)-methyl)-piperidine hydrohalide the halogen having an atomic number greater than 10.

7. 2-(dithienyl-(2)-methyl)-piperidine hydrochloride.

References Cited in the file of this patent

UNITED STATES PATENTS 2,739,968    Sperber _____ Mar. 27, 1956

OTHER REFERENCES

Simons: Industrial and Engineering Chemistry, vol. 39, page 238, 1947.